Dec. 12, 1939.　　　A. C. PETERSON　　　2,183,151
AIRPLANE GENERATOR AND POWER SYSTEM
Original Filed Nov. 22, 1935　　　3 Sheets—Sheet 1
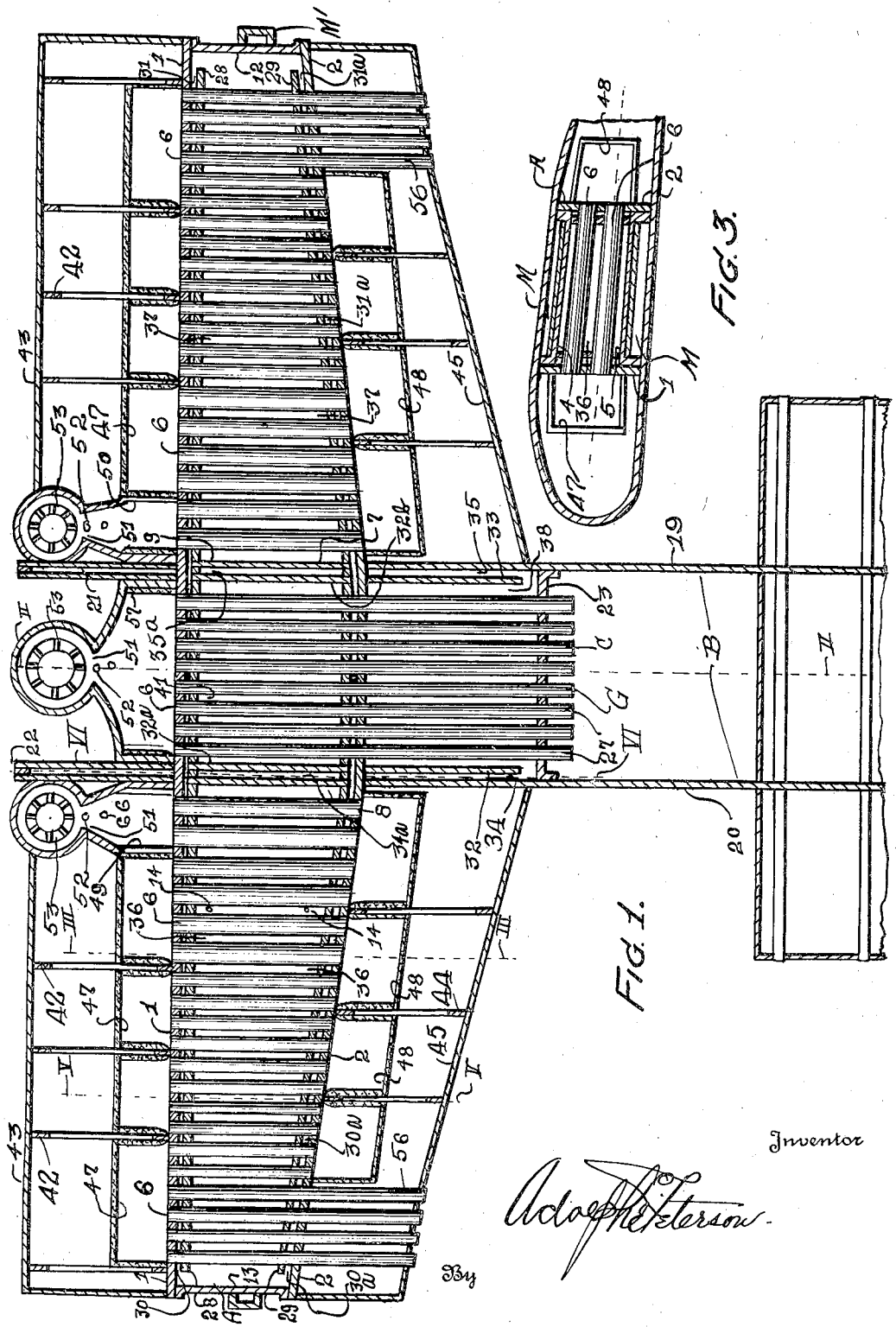
Inventor
Adolf C. Peterson
By Dec. 12, 1939.  A. C. PETERSON  2,183,151
AIRPLANE GENERATOR AND POWER SYSTEM
Original Filed Nov. 22, 1935  3 Sheets-Sheet 2
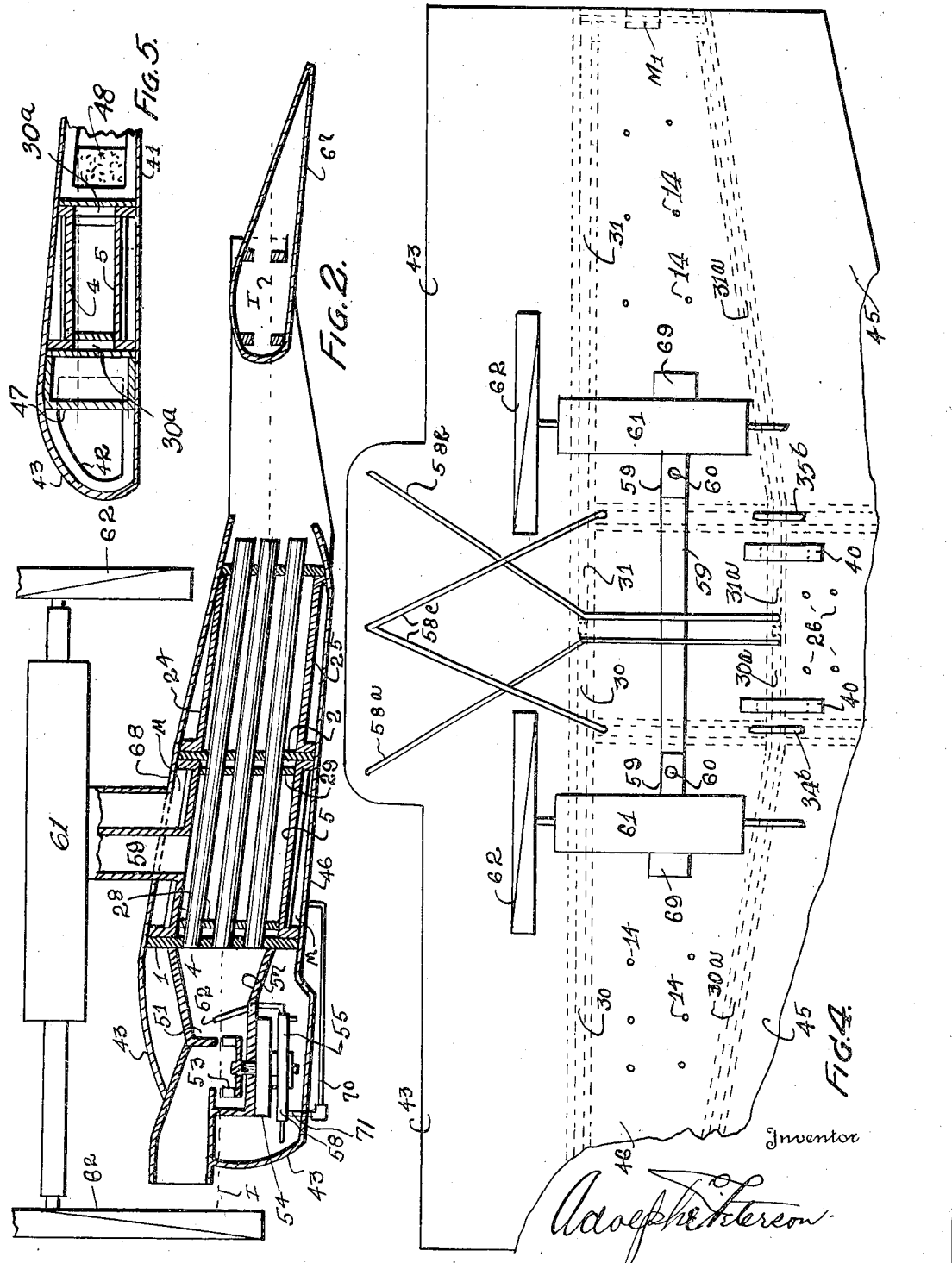
Inventor
Adolph C. Peterson Dec. 12, 1939.  A. C. PETERSON  2,183,151
AIRPLANE GENERATOR AND POWER SYSTEM
Original Filed Nov. 22, 1935    3 Sheets-Sheet 3
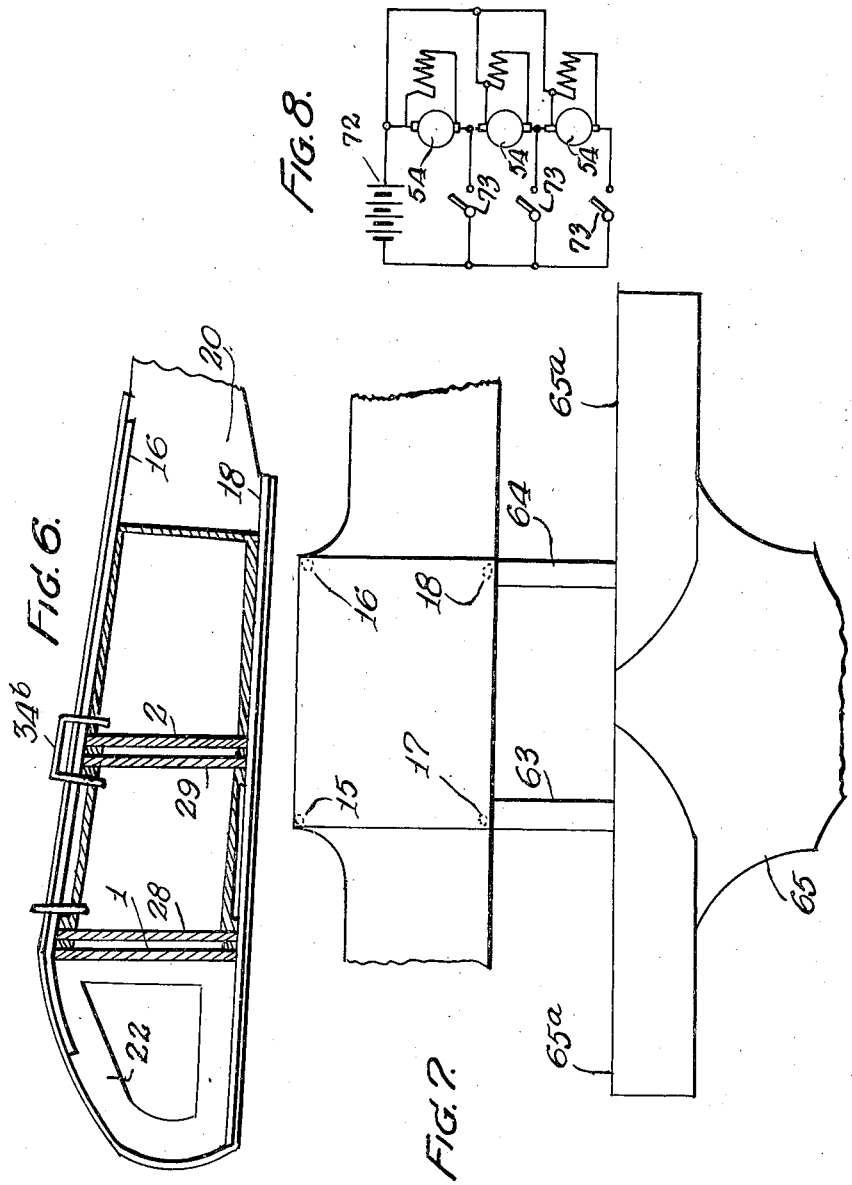
Inventor
Adolph C. Peterson.

Patented Dec. 12, 1939

2,183,151

UNITED STATES PATENT OFFICE 2,183,151

AIRPLANE GENERATOR AND POWER SYSTEM

Adolphe C. Peterson, Minneapolis, Minn.

Application November 22, 1935, Serial No. 51,060
Renewed May 8, 1939

18 Claims. (Cl. 244—53)

My invention relates to airplanes and power systems therefor and particularly to an improved form of generator and power system in combination with an airplane construction, wherefore it is called improved airplane generator and power system.

The principal objects of my invention are to provide a form of airplane construction and power system which shall be simple in construction, and reliable in operation while at the same time having such light weight and reliability and strength that it can be satisfactorily used for airplanes. The principal objects of my invention are to provide an improved form of vapour or steam generator construction for use in airplanes which construction shall be so embodied in the airplane construction that it is an inherent and component part of the airplane construction, and so that therefore the airplane structure serves the dual purpose of supporting the wing surfaces and also embodies the generator construction wherefore the net result is a steam or fluid vapour generating system which is simple and light weight and readily adapted to use in airplanes. An object is to render possible by the use of my construction the adoption of steam or vapour or other fluid vapour pressure for power generation and driving of airplanes so that thereby the airplane power system and the propelling of the airplane is rendered as safe and reliable as the vapour or steam power plant customarily is. An object is to conserve weight in the construction of an airplane and power system therefore by the dual use of material or structure and thereby the saving of weight. An object is to provide an improved form of spar and generator construction, and thereby an improvement over my previously patented airplane generator construction.

The principal devices and combinations of devices comprising my invention are as hereinafter described and as defined in the claims. In the accompanying drawings which illustrate my invention like characters refer to like parts throughout the several views.

Referring to the drawings:

Figure 1 is a view chiefly in horizontal cross section through the wing structure and spar structure of an airplane embodying my invention, this section being taken on the line I—I of Figure 2.

Figure 2 is a view in vertical section on the line II—II of Figure 1.

Figure 3 is a view in vertical section on the line III—III of Figure 1.

Figure 4 is a plan view some parts being broken away and the structural parts having their covering.

Figure 5 is a vertical cross section at right angles to that of Figure 1 on the line V—V of Figure 1.

Figure 6 is a section on line VI—VI of Fig. 1.

Figure 7 is a front elevation of so much of the central structure of the wing structure of the airplane and a hull 65 as is necessary to show the attachment of the hull to the wing structure, the latter being broken away in that figure on its ends.

Figure 8 is a diagram of an electric circuit through the motors 54 and their controls and current source, any form of current source being appropriate but a storage battery being shown.

Referring again to the drawings, the letter A indicates a main wing spar of the airplane. This spar A constitutes the supporting structure of the airplane wing and is of such strength and size that it provides by itself all of the strength necessary for the support of the wing structure, and itself constitutes part of the wing structure. This spar lies near the middle portion of the wing, from front to rear, and occupies a considerable part of that distance from front to rear of the wing, say about one fourth to one third of that distance, depending on the relative shape of the wing, its depth and the size of the airplane and construction.

The spar A is constructed as shown as one wing spar extending from one extreme tip of the wing to the other extreme tip at the other end of the wing, but it may be constructed in two separate portions attached to the opposite sides of an airplane fuselage if desired. The construction shown is adopted as the construction most readily manufactured and assembled.

The spar A has two beams 1 and 2 at its front and rear side respectively, these beams being preferably constructed of steel although they may be constructed of some alloy such as aluminum, but the alloy used should be relatively highly resistant to heat, although these beams 1 and 2 are protected from the excessive heat as hereafter described. The beams 1 and 2 are each relatively wide vertically at the central portion of their length and they each taper toward their ends and they are nearly of the same vertical height at the same transverse portion of the spar although the rear beam 2 is somewhat narrower vertically, but this may be as best determined in practice.

The beams 1 and 2 have at their upper and lower edges rigidly attached thereto by riveting or bolting or welding steel or other metallic sheets 4 and 5 respectively on the upper and lower sides of the spar, these sheets being relatively strong for the purpose hereinafter described and they have such flanges formed with them as will facilitate attachment of the sheets to the beams 1 and 2. The beams 1 and 2 in their formation have apertures formed in them, the apertures being larger in the central portions and smaller in size as they near the tips of the beams and more numerous as they near the tips of the wings, and each such aperture in the forward or front beam 1 is substantially on the horizontal plane and axially in line with a corresponding aperture in the rear beam 2 and each such pair of corresponding or in line apertures has placed in it and welded to the front beam 1 at its front end and rear beam 2 at its rear end a steel or aluminum or alloy tube 6. Each such tube 6, which constitutes a fire tube, is so welded into the beam material that a tight and rigid weld with the beam is formed which is pressure tight and also gives such strength that the tubes 6 aid in giving rigidity and strength to the beams 1 and 2.

There is welded into the interior of the spar A thus formed or riveted into it two partitions 7 and 8 which are vertically placed and substantially longitudinally from front to rear of the spar or wing and they completely divide the interior of the spar structure into the central space 9, which is relatively short laterally of the airplane and the two long divisions 36 and 37 extending from the partitions 7 and 8 respectively outwardly toward and to the tips of the spar structure. At the tips of the spar structure there are vertically placed end closing walls or pieces 12 and 13 of metal which close the ends of the spar structure. The upper and lower metallic sheets 4 and 5 are at intervals connected by long bolts or bars 14 which pass vertically between adjacent tubes 6 and through the sheets 4 or 5 and at the contacts with the sheets are welded into the sheets and these bolts or bars have heads as shown of which one of each is riveted down on to the metal of the sheet and then welded to it so that the bolts or bars form a tensional connecting link between the sheets 4 and 5 so as to give added strength against flexing of the sheets 4 and 5 from pressure within the spar structure. These bars 14 also serve to give added rigidity and supporting strength to the spar structure and for this purpose may if desired be placed angularly to the vertical as in beam structure generally.

The partitions 7 and 8 are placed at a distance apart which is substantially that or nearly that of the width laterally of a fuselage or hull structure which may be used with the wing structure. At the location of these partitions 7 and 8 there are placed above the spar structure strong rods or beams 15 extending from front to rear and below the spar structure rods or beams 17 extending from front to rear and all of these rods or beams extend some distance forwardly and rearwardly from the spar structure so that they may have welded to them the upper and lower edges or flanges of longitudinally extending tail beams 19 and 20 and forwardly extending short beams 21 and 22.

The tail beams 19 and 20 and forward beams 21 and 22 are substantially the height vertically of the spar structure A at the point of juncture with them and at this point of juncture they are welded to the beams 1 and 2 of the A spar structure.

At a distance somewhat centrally of the length of the tail beams 19 and 20 there is welded to the tail beams a transverse short beam 23 and on the upper side of the tail beams a sheet 24 of metal and on the lower side of the tail beams a sheet 25 of metal is welded to the beams and bars or bolts 26 are placed vertically between the sheets at intervals and welded to them to form pressure resisting tensional support between the sheets 24 and 25 and these sheets and transverse beam 23 close the interior of the tail spar structure thus formed and denoted the B tail spar. This B or tail spar structure has apertures in the transverse beam 23 in which are welded the rear ends of fire tubes 27 which are relatively long and pass to the rear ends of the fire tubes 6 which are located between the partitions 7 and 8 and are welded to such rear ends of these fire tubes so that the interiors of the tubes between partitions 7 and 8 and the fire tubes 27 form coaxial and extended fire tubes denoted C passing through the spar structure between the partitions 7—8 and tail beams 19—20.

In the course of the construction of the spar structure described there are also placed within the beams 1 and 2 extending parallel to them and of the same vertical heights supplemental beams 28 and 29 which divide the interior space and form so-called water conduits 30 and 31 and 30a and 31a, all of which are relatively thin horizontally and may constitute say five per centum or ten per centum of the interior space of the spar structure. And likewise supplemental beams 32 and 33 are placed within the tail beams 19 and 20 and form so called water conduits 34 and 35. The supplemental beams described may be relatively thin and of not great strength as they do not have any difference of pressures on their sides of any consequence but whatever strength they do have is added to the structural strength of the spar structure as they are welded to their upper and lower sheets or to the upper and lower edges of the beams by flanges made for the purpose.

The water conduits 30 and 31 extend individually from a point near the mid-portion of the beams 1 and 2 (as to 30a and 31a) outwardly to the opposite ends of the A spar structure, as do also the water conduits 30a and 31a, but at each spar end a short space is left between the end of the supplemental beam and the end or closing pieces 12 and 13 so that a conduit is formed whereby liquid may pass between the beam 1 or 2 and the adjacent supplemental beam from the point adjacent to the respective partition 7 or 8 to the end of the A spar and thence around the end of the supplemental beam to the central space 36 or 37 respectively wherein the fluid whether liquid or gaseous or vaporous passes from the outward lateral ends of the spar structure toward the partitions 7 and 8 respectively. The water conduits 30 and 31 and likewise the water conduits 30a and 31a are shown divided or separated from each other by metal formed in or welded in between the beams 1 and 28 at their exact center horizontally, and between the beams 2 and 29 at their exact center horizontally, so as to divide the water coming from conduit 58a from that coming from conduit 58b.

The water conduits 34 and 35 extend from the beam 2 rearwardly to a point just a short distance short of the transverse beam 23 and liquid may thus pass rearwardly through these water conduits around the rear ends of the supplemental beams 32—33 into the central space 38 and therein as vapour or gas or liquid converting to vapour or gas passes forwardly in that central space 38. Short supplemental beams 32a and 32b are likewise placed just inside the partitions 7 and 8 and form water conduits 34a and 35a which at their rear ends are connected with the forward ends of the water conduits 34 and 35 by short U shaped liquid pipes or passages 34b and 35b placed above the beam 2 or that is passing around its upper edge at the points indicated.

A short U shaped pipe or passage 40 or two of these passages 40 pass vertically over the rear edge of beam 2 to connect the forward end of the interior space 38 with the interior space 41 between the partitions 7—8.

At the front side of the A spar structure there are riveted or welded to the beam 1 the rear ends of front rib sections 42 and these sections are of such shape individually that they form a proper supporting structure for the wing surfaces attached, 43, which will form a properly shaped leading edge for the wing supported by the A spar. At the rear side of the A spar structure there are riveted or welded to the beam 2 the front ends of rear rib sections 44 and these sections are of such shape individually that they form a proper supporting structure for the wing surfaces attached, 45, which will form a properly shaped rear edge or trailing edge for the wing surfaces 46 attached. The rear rib sections are placed in positions so that in the lateral distance of the A spar structure they are each midway between locations of the front ribs sections. Between each pair of front rib sections there is placed a light fire resistant and heat retaining or heat insulating fire chamber 47 made of light fire resistant material as asbestos or an aluminum composition or compound or a combination of materials each of which is open to the front ends of the fire tubes 6 between such two rib sections. Likewise similar fire resistant chambers 48 are placed between each pair of rear rib sections with their front sides open to the rear ends of the fire tubes between such two or pair of rear rib sections 44. However the space between the pair of front rib sections 42 nearest the portions 7 and 8 just outside or beyond the location of such partition has a larger combustion chamber 49 and 50, respectively formed of such fire resistant material each of which has at its forward end a narrow air and fuel mixing neck 51 in which are fuel nozzles 52 and vents from air blowers 53, the latter driven by motors 54 which may be electric or otherwise. The motors 54 drive fuel pumps 55 individually also.

The fire chambers 47, 48 form with their related fire tubes 6 a gas or fire route in each opposite end of the A spar structure one route passing from the combustion chamber 49 to fire tubes 6 in its rear thence from a fire chamber 48 to related fire tubes 6 thence a fire chamber 47 to its related next series of fire tubes 6 and thence a fire chamber 48 and so on to the end of the A spar where the last series of fire tubes 6 deliver rearwardly through exhaust tubes 56 to atmosphere rearwardly of the airplane.

Immediately in front of the fire tubes C, that is in front of beam 1 between the short beams 21—22, there is placed a combustion chamber 57 of fire resistant material having its open end delivering to the front of the C tubes and having a mixing neck 51 with fuel nozzle 52 delivering thereto and related vent from a related individual blower 53 driven by a motor 54, the latter driving a related fuel pump 55. The route of fire or gases from combustion chamber 57 is rearwardly through tubes C and thence directly to atmosphere at the rear end of the central portion of the wing structure.

Each motor 54, of which there are three, also drives a related water or other generator liquid pump 58 which delivers water or generator liquid proportionately with the delivery of air and fuel to the related combustion chamber, to the related near ends of the water conduits 30 and 31 and 30a and 31a or 34 and 35, that is to the near ends of all water conduits near the junctures of beams 1 and 2 with partitions 7 and 8 and also to the water conduits passing rearwardly along partitions 7 and 8 and tail spars 19 and 20. The short U-shaped tubes 34b and 35b connect the front and rear sections of the spaces 34 and 35, respectively. By this means the water passes in streams outwardly along each side of the A spar along both its beams 1 and 2 and also along the tail beams or spars and is somewhat heated and cools these beams and passes to the interior and central spaces where its passes being converted to vapor or steam towards the central portions of spar A and front end of the central space and passes from each of these three spaces to headers 59 and thence as controlled by control valves 60 to vapor or steam motors or turbines 61 which drive the individual propellers 62. These motors may be reciprocating motors or turbines as found best or most suitable for efficiency or for the design and size of the airplane. Ignition means 66 is provided for each combustion chamber.

At the location of the partitions 7 and 8 there are depending metallic sections 63 and 64 respectively which at their upper ends are welded to the under sides of the A spars and at their lower ends are welded or riveted to the upper side of a hull or body 65. The hull or body 65 is shown as a hull adapted to use on water but may be constructed as a land fuselage and if so would have landing wheels and in this case the passenger carrying fuselage might be supported immediately above the central portion of the A spar structure. The hull 65 may have laterally extending side wing and float stubs 65a.

The tail beams 19 and 20 extend rearwardly somewhat beyond the wing surfaces of the central section and at their extreme rear ends carry the rear stabilizer and directional rudders 67. Such parts are only diagrammatically shown as the invention lies principally in the structural portions and the generator means.

The A spar has on the outside of the upper and lower sheets a thin aluminum foil or other heat insulating means in sheets applied thereto. The A spar has also supplementary or outside wing sheathing 68 applied on the upper side and 46 on the lower side of the spar in sheets extending between the front and rear edges of the A spar and these sheets or sheathing 68 and 46 are welded or riveted at the upper flanges of the 1 and 2 beams as shown so that the joint is tight and so that a thin space M is formed between the A spar and the sheathing 68 which space M is a condenser space and exhaust vapor from the motors is passed by conduits 69 to the upper and central ends of this space and then passes through these spaces M toward the ends of the A spar and thence around the ends of the A spar through suitable conduits MI and backward in the space M on the under side of the A spar and thence by conduits 70 to the supply or supply conduit 71 where it will serve for replenishing the generators by the water or generator liquid pumps.

The condenser space M provides partly for insulating the A spar and partly for condensation by the cold outside air passing over the outer sheathing 63 and 46 in flight of the airplane. It is contemplated that other types of condensing means may be used and that other supplementary condensing means may be used but this condensing means is shown as particularly adapted to weight saving, since the sheathing 68 may be aluminum since it need carry no particular weight or stresses and since one side of the condenser space is completed by the material of the A spar and thus economy of weight is secured. I have not shown automatic heat and pressure regulation means for the generators since it is contemplated that any of the known types of such regulation means may be readily applied in such form as is desired or found to be most suitable. A battery 72 is provided for driving the motors and each generator motor may be started or stopped by the switches 73 and the latter may be automatically or hand controlled. Instead of the battery any type of electric current supply may be used and any type of blower driving engines or motors may be used, and it is contemplated that the air and fuel and generator fluid supplies will be so proportioned as to properly produce the pressure and heat necessary for efficient generation of fluid pressure for the propeller motors or engines but there may be automatic proportioning means for this purpose of any known type. The main propeller motors utilizing the fluid generated by the generators may be of a rotary piston type and in this form they would be simple and efficient for utilization and pressures of as much as six or eight hundred pounds may be efficiently used with a very light weight engine.

In the operation each blower and fuel motor drives its related blower and fuel and generator liquid pumps for its related generator and the fuel and air are mixed and burned in the combustion chambers, and the burning gases from one combustion chamber to an associated generator pass through fire tubes 6 of a wing generator in series of sets, through a set rearwardly, then a set forwardly, then a set rearwardly, and so on until the end of the spar is reached and then the gases pass rearwardly to atmosphere and in this passage the generator liquid is heated. This liquid passes as liquid through the water or liquid conduits adjacent the beams 1 and 2 toward the ends of the A spar thence into the interior or central space and thence backwardly toward the central portion of the A spar where it passes to the motors and then from the motors to the condensers. The combustion gases from the central chamber pass directly rearwardly through the C fire tubes and the generator liquid in this section passes through the water conduits adjacent the tail beams 19—20 rearwardly and thence into the central vapor spaces and thence back forwardly and is at the forward end delivered to the motors and thence from the motors to the condensers and from the condensers the condensed liquid is again ready for use in the heat cycle or generation cycle.

While I have shown particular devices and combinations of devices in the illustration of my invention I contemplate that other detailed devices and combinations of devices may be used in the realization of my invention without departing from the spirit and contemplation thereof.

What I claim is:

1. A steam generator for an airplane having wings including a central structure and a main tubular member for the wings, the central wing structure having supported therein and extending from each side the tubular wing spar, means for delivering a generator liquid under pressure to the remote end of each tubular wing spar and means for delivery from the inner end of each tubular wing spar generator fluid under pressure to a power conversion means, and heating tubes in the tubular wing spar and means whereby they each may receive gases under combustion or gases of combustion.

2. A steam generator for an airplane having wings including a central structure and a main tubular member for the wings, the central wing structure having supported therein and extending from each side the tubular wing spar, means for delivering a generator liquid under pressure to the remote end of each tubular wing spar and means for delivery from the inner end of each tubular wing spar generator fluid under pressure to a power conversion means, and heating tubes formed transversely in the tubular wing spar and means whereby they each may receive gases under combustion or gases of combustion for heating thereof.

3. A steam generator for an airplane having wings including a wing structure, the wing structure embodying tubular wing spars supported in and by the wing surfaces, an exterior conduit section in the tubular wing spar for conveying a generator liquid and an interior section in the wing spar for conveying the generator liquid and superheating thereof for vapour conversion, and combustion gas conduits passing through the sections for heating thereof and means for supplying the combustion gas conduits with gases under combustion or of combustion.

4. A steam generator for an airplane having wings, including a wing spar, a tubular spar extending rearwardly therefrom and adapted to support rudder and stabilizing surfaces, means for delivering a generator liquid to one end of the tubular spar and means for delivering vapour under pressure from the spar to a power conversion means and means for the heating the generator fluid in the tubular wing spar.

5. A steam generator for an airplane having wings including a wing spar, the wing spar comprising a generator casing constituting the wing spar structure and having heating conduits passing therethrough and means for passing a generator fluid through the generator casing and means for passing combustion gases through the heating conduits.

6. A steam generator for an airplane having wings including a wing spar, the wing spar comprising a generator casing constituting the wing spar structure and having heating conduits passing transversely through and means for passing a generator fluid through the generator casing and means for passing combustion gases through the heating conduits.

7. A steam generator for an airplane having wings including a wing spar structure, the wing spar structure embodying a generator casing and fire tubes trnsversely thereof, means delivering a generator liquid to the generator casing and delivering vapour under pressure therefrom to a motor means driving a propeller, and means passing gases of combustion through the fire tubes for the heating thereof.

8. The novel means described in claim 7 and in combination therewith a tubular spar extending rearwardly from the generator casing and means whereby generator liquid may be delivered to the tubular spar and means whereby vapour under pressure may be delivered therefrom to motor means driving a propeller means and heating tubes passing through the rearwardly extending tubular spar and means for passing gases of combustion therethrough.

9. A steam generator for an airplane having wings including a wing spar structure, the wing spar structure embodying a plurality of generator casings constituting wing spars and heating tubes transversely of the spar or generator structure and means for passing generator fluid through the generator spar structure and supply thereof under pressure to a motor means driving a propeller, and means for passing gases of combustion through the heating tubes.

10. A steam generator for an airplane having wings including a wing spar structure, the wing spar structure embodying a plurality of generator casings constituting wing spars or spar each generator casing comprising a primary division and a secondary division, means for passing generator fluid to the primary division and therethrough to the secondary division, heating tubes transversely of the generator casing or casings and means for passing gases of combustion through the heating tubes for heating of the primary and secondary divisions.

11. A steam generator for an airplane having wings including a wing spar structure, the wing spar structure embodying a plurality of generator casings constituting wing spars or spar each generator casing comprising a primary division and a secondary division, means for passing generator fluid to the primary division and therethrough to the secondary division, heating tubes transversely of the generator casings or casing, and means for passing gases of combustion through said heating tubes progressively in series for heating of said primary and secondary divisions.

12. A steam generator for an airplane having wings including a wing spar structure, the wing spar structure embodying a generator casing constituting a wing spar the generator casing comprising a primary division and a secondary division, means for passing generator fluid to the primary division and therethrough to the secondary division, heating tubes transversely of the generator casing and means for passing gases of combustion through said heating tubes progressively in series for heating of said primary and secondary divisions.

13. A steam generator for an airplane having wings including a wing spar structure, the wing spar structure embodying a generator casing wing spar, the generator casing wing spar comprising a plurality of beams and upper and lower surfaces therefor and closing means at each end, the beams forming divisions of the generator casing wing spar, means for passing generator fluid to one or more divisions as a primary heating unit and therethrough to one or more of the other divisions as a secondary heating division, heating flues constructed in said generator casing wing spar, and means for passing gases of combustion through said heating flues.

14. A steam generator for an airplane, having wings including a wing spar structure, the wing spar structure embodying a generator casing wing spar the generator casing wing spar comprising a plurality of beams and upper and lower surfaces therefor and closing means at each end, the beams forming divisions of the generator casing wing spar, means for passing generator fluid to one or more divisions as a primary heating unit and therethrough to one or more of the other divisions as a secondary heating division, heating flues constructed in said generator casing wing spar, and means for passing gases of combustion through said heating flues.

15. A steam generator for an airplane, having wings including a wing spar structure, the wing spar structure embodying a generator casing wing spar the generator casing wing spar comprising a plurality of beams and upper and lower surfaces therefor and closing means at each end, the beams forming divisions of the generator casing wing spar, means for passing generator fluid to one or more divisions as a primary heating unit and therethrough to one or more other divisions as a secondary heating unit, heating flues constructed in said generator casing transversely thereof, and means for passing gases of combustion through said heating tubes progressively in series for the heating of said divisions.

16. The novel means described in claim 14 and leading edge wing sections and trailing edge wing sections attached to the front and rear of said generator wing spar, respectively.

17. The novel means described in claim 14 and supplementary upper and lower surfaces or sheets attached to the generator casing wing spar to form condenser divisions on the upper and lower sides of the spar, and means for passing gas under pressure from the secondary heating division to a motor means driving a propeller means, and means for passing vapour or gas from the motor means to the condenser divisions, and thence to the generator fluid supply means.

18. A steam generator for an airplane having wings including a wing spar, the wing spar formed of a pair of beams and upper and lower surfaces attached to the beams and closing means at each end of the beams to form an interior generator casing, transverse flues secured at their ends in the beams, and means for passing gases of combustion from an air and fuel supplying means progressively in series through the transverse flues, and means for passing a generator fluid to the interior space of the wing spar and therethrough to a motor means for the driving of a propeller means.

ADOLPHE C. PETERSON.